Nov. 20, 1951     E. H. LAND     2,576,022
PHOTOGRAPHIC APPARATUS
Filed Oct. 14, 1948     3 Sheets-Sheet 1

INVENTOR
Edwin H. Land
BY Donald L. Brown
and Oliver W. Hayes
Attorneys

Nov. 20, 1951  E. H. LAND  2,576,022
PHOTOGRAPHIC APPARATUS
Filed Oct. 14, 1948  3 Sheets-Sheet 2

INVENTOR
Edwin H. Land
BY Donald L. Brown
and
Oliver W. Hayes
Attorneys

Nov. 20, 1951 E. H. LAND 2,576,022
PHOTOGRAPHIC APPARATUS
Filed Oct. 14, 1948 3 Sheets-Sheet 3

INVENTOR
Edwin H. Land
BY Donald L. Brown
and Oliver M. Hayes
Attorneys

Patented Nov. 20, 1951

2,576,022

UNITED STATES PATENT OFFICE 2,576,022

PHOTOGRAPHIC APPARATUS

Edwin H. Land, Cambridge, Mass., assignor to Polaroid Corporation, Cambridge, Mass., a corporation of Delaware Application October 14, 1948, Serial No. 54,496

15 Claims. (Cl. 95—13)

This invention relates to photography and more particularly to novel photographic apparatus, such as a camera, wherein negative and positive images are preferably concurrently produced on negative and positive sheets by advancing the two sheets, in superposed relation and in conjunction with a processing liquid located therebetween, past a liquid-spreading means which spreads the liquid between the sheets. In such a camera, the thus processed sheets are preferably advanced from the liquid-spreading means into a chamber where formation of positive and negative images takes place in freedom from actinic light.

A principal object of the present invention is to provide an improved camera of the above type capable of use under extreme temperature conditions, such as would be encountered in special industrial or technical application, without impairing the quality of the photographic images obtained by the processing accomplished within such a camera. In some such cases the temperatures are extremely high and in others they are extremely low.

Still another object of the invention is to provide, in such a camera, a novel means for rendering a heating means operative to apply heat to the processing liquid.

These and other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

In a preferred embodiment of the present invention, the camera is arranged for exposing and processing a photosensitive sheet which preferably includes a layer of a photosensitive silver halide. This processing is accomplished in conjunction with another sheet which is in superposed relation with said photosensitive sheet and in conjunction with a processing liquid which is located between the sheets when they are superposed. The camera includes means defining an exposure opening for exposing a predetermined area of the photosensitive sheet, this exposure opening being preferably associated with a usual lens and shutter. A portion of the camera defines a dry-processing chamber and other portions of the camera define a second chamber. The dry-processing chamber includes a pressure-applying means which preferably includes a pair of pressure members such as pressure rolls which act, without contacting the liquid, to spread this processing liquid between these two sheets, thus forming a sandwich of the two sheets as they pass into the second chamber. Within the second chamber the spread liquid accomplishes the desired processing, this processing comprising at least the development of the exposed photosensitive area and preferably including concurrent development of a negative image on the photosensitive sheet and a positive image on the second sheet. This second sheet will be hereinafter referred to as an image-carrying sheet.

The present invention is primarily concerned with improvements in cameras of the above type which facilitate obtaining good images despite extremely wide temperature variations encountered in the use of the camera. In a preferred form of camera embodying the invention, the second chamber includes at least one surface-defining wall and means are associated with this wall for maintaining the latter at a desired temperature. Means are also included in the camera for maintaining one of the sheets of the sandwich in heat-transferring relation to this wall. In a preferred construction of this second chamber two walls are provided, at least one of which is maintained at the desired temperature, and the walls are spaced apart by a distance not much greater than the thickness of the sandwich to be received therebetween. Thus, the second wall of the chamber acts as a means for supporting one of the sheets in heat-transferring relationship to the wall maintained at the desired temperature. These walls are preferably substantially planar and substantially parallel, thereby defining a substantially planar chamber which has a transverse dimension slightly larger than the width of the sandwich and a thickness on the order of the thickness of the sandwich.

Figure 1:
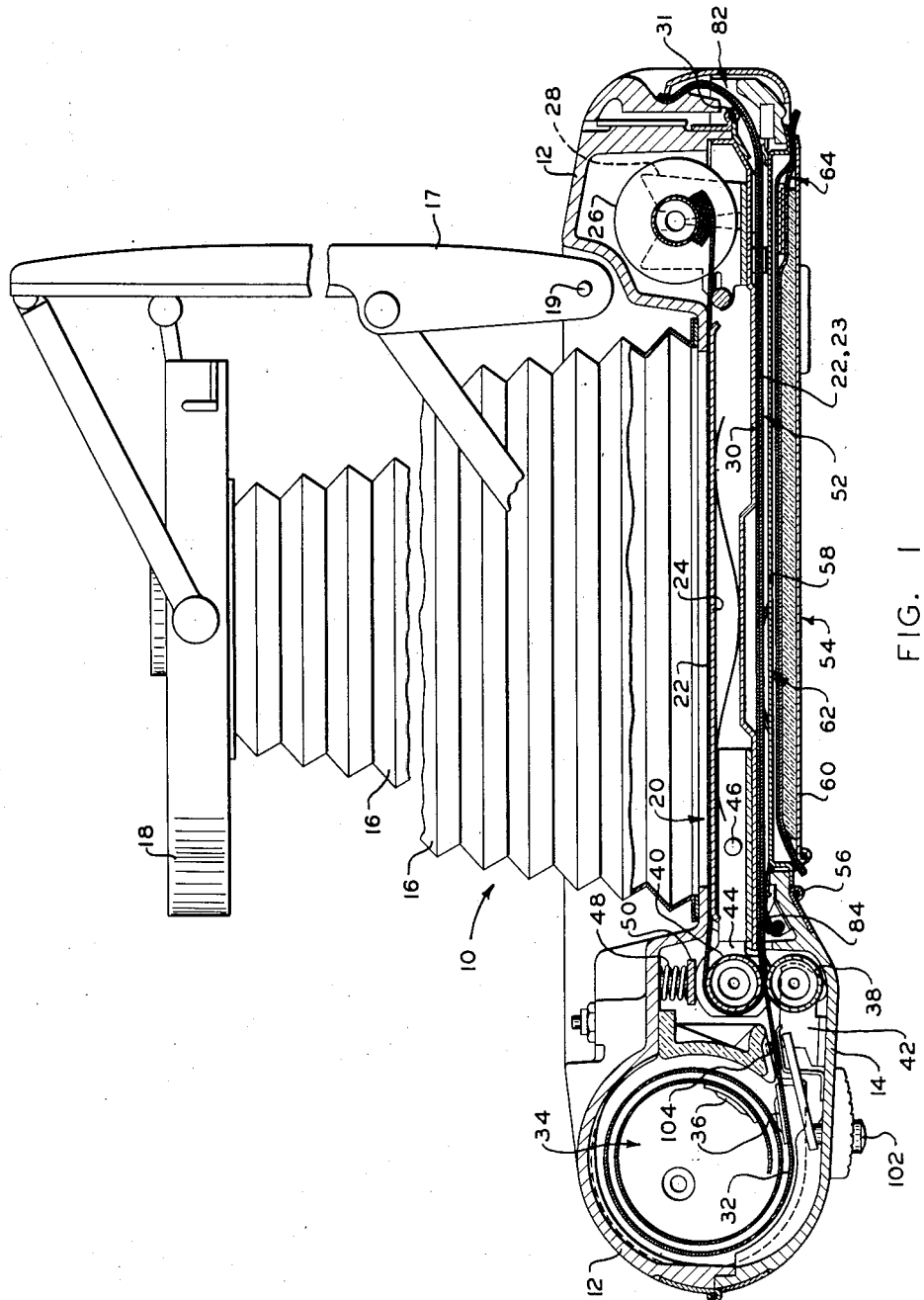
Figure 1 is a diagrammatic exaggerated fragmentary sectional view of one preferred form of the invention as embodied in a hand-held camera.
Figure 2:
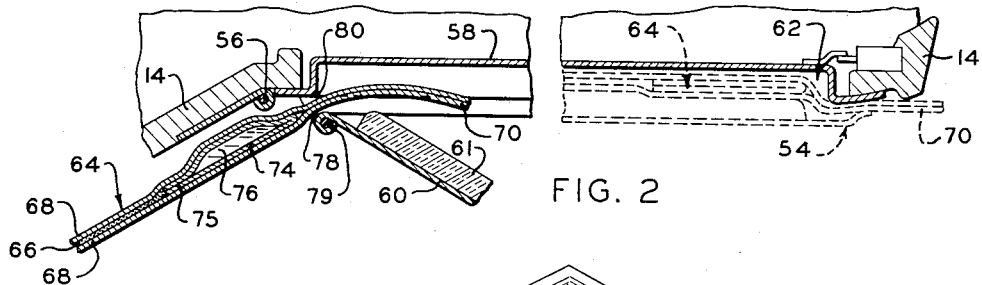
Fig. 2 is an enlarged fragmentary sectional view of a portion of Fig. 1.

Referring now to Figs. 1 and 2 there is shown one preferred form of the present invention as embodied in a hand-held camera wherein the photosensitive and image-carrying sheets are separately supplied and are advanced to superposition after exposure of the photosensitive sheet. In this form of the invention the processing liquid is preferably viscous and is preferably carried by a container therefor, located on one of the two sheets, so as to be positioned between the sheets as they are superposed.

For use in the camera of Figs. 1 and 2 the image-carrying sheet is composed of a plurality of separable image areas, these areas being defined by perforations substantially surrounding the areas to assist in separating the processed image from the sandwich. For providing access to the second chamber for removing the positive image area, a door is preferably included in one of the walls of the chamber, this door, in the illustrated form of the invention, comprising that wall of the chamber which is maintained at said predetermined temperature.

In these figures, camera 10 is shown as comprising a front housing 12 and a rear housing 14 connected thereto by a means such as a hinge 13. The front housing 12 carries a bellows 16 to which is connected a lens and shutter assembly schematically indicated at 18. For properly positioning the lens and shutter with respect to the front housing 12 there is provided a cover 17 pivoted to the front housing 12 as at 19. The front housing 12 also includes an exposure opening 20 behind which a photosensitive sheet 22 is adapted to be held in exposure position, within the focal plane of the camera, by means of a backing plate 24. For holding a spool 26, carrying the supply of the photosensitive sheet 22, there is included a spool holder 28 shown as being secured to a partition member 30 which extends between the two housings 12 and 14. Partition 30 is preferably hinged to front housing 12 at 31. For holding a supply of image-carrying sheet 32 there is provided a chamber 34 from which the image-carrying sheet can be fed into superposition with the photosensitive sheet 22 after exposure of the latter sheet. A plurality of containers 36 are shown as being secured at spaced intervals to the surface of the image-carrying sheet, each of these containers carrying a processing liquid, the containers being secured to that surface of the image-carrying sheet which is to be brought into superposition with the exposed photosensitive sheet.

For superpositioning the two sheets and for processing the two sheets by releasing the processing liquid from a container 36 and spreading this liquid between the two sheets 22 and 32, there is provided a pair of pressure rolls 38 and 40. Roll 38 is preferably secured, by means of a bracket 42, to rear housing 14, while pressure roll 40 is preferably carried by a pair of arms 44 secured, as at 46, to partition member 30. A pair of springs 48 and a pressure bar 50 apply a resilient load to rolls 38, 40 when these rolls are in the position shown in Fig. 1.

The partition member 30 defines, with rear housing 14, a substantially planar chamber 52 into which passes the sandwich formed by laminating sheets 22 and 32 together by means of the layer of spread processing liquid. As can be seen, this chamber 52 is not much thicker than the thickness of the sandwich 22, 32 and has a transverse dimension slightly greater than the width of the sandwich 22, 32. This chamber is preferably sufficiently long to receive at least one processed image area. For providing access to a processed image area in chamber 52 there is included a door 54 in the rear housing 14, this door being hingedly connected to housing 14 as at 56.

In a preferred form of construction an inner wall 58 of the door 54 is that surface of the chamber 52 which is maintained at a desired temperature. In a preferred form of the invention this wall 58 is heated in order to transfer heat to the layer of liquid in the sandwich 22, 32. An outer wall 60, of door 54, preferably cooperates with the inner wall 58 thereof to form a chamber 62 within the door for supporting a heating medium, generally indicated as a bag at 64, specific forms of the door and the bag being shown best in Figs. 2 and 3. The bag 64 preferably comprises a stratum 66 of material capable of entering into an exothermic reaction. The bag comprises outer walls 68 which are preferably moistureproof, these walls being sealed along the edges, and the ends of the walls being formed into a leader portion 70. Between the walls there is positioned the stratum 66, this stratum being shown, in a preferred form, as comprising a porous sheet, such as a blotter, confining the material to enter into the exothermic reaction. For providing a supply of water capable of creating an exothermic reaction with the material in stratum 66, there is included a collapsible container 74 having a rupturably sealed discharge mouth 75 and preferably carrying a predetermined quantity of viscous aqueous liquid 76. There is preferably sufficient water to thoroughly wet the stratum 66 so that the exothermic reaction will continue for a substantial period of time. This water may advantageously include a viscosity-increasing material such as sodium carboxymethyl cellulose.

As can be seen best in Fig. 2, the outer wall 60 of door 54 is pivotally connected to the remainder of the door by means of a hinge 79. This door is preferably provided with a pair of pressure-applying members adapted to release the liquid 76 from the container 74 and to spread this liquid across the surface of the stratum 66. In the preferred form illustrated, these pressure-applying members comprise a curved surface 78, associated with the hinge 79, which cooperates with a second curved surface 80, preferably carried by inner wall 58, these surfaces being spaced apart by a distance slightly greater than the thickness of the bag 64. A heat-insulating stratum 61 is preferably included as a part of the outer wall 60 of door 54 to prevent loss of heat to the atmosphere and also to prevent this outer wall from getting too hot to touch in those cases where the exothermic reaction generates a relatively high temperature.

A discharge opening 82 is provided at the right-hand end of the sandwich-receiving chamber 52 and a light-seal blade 84 is preferably provided at the left-hand end of the chamber 52 adjacent the pressure rolls 38 and 40. Suitable light seals and latches are provided for preventing fogging of the photosensitive sheet and for maintaining the various elements of the camera in operative position.

When employing a preferred type of photochemical process in the above-described camera, the photosensitive sheet comprises a silver halide emulsion coated on a suitable base, the image-carrying sheet comprises baryta paper and the processing liquid includes an aqueous alkaline solution of a developer, a silver halide solvent and a film-forming material. The material entering into the exothermic reaction may comprise, for example, finely pulverized metals and other materials which readily oxidize when wetted with water. Examples of such materials are set forth in United States Patents 2,126,734 and 2,040,406.

When extremely low temperatures are encountered one may use materials capable of entering into a highly exothermic reaction, such as those described in United States Patents 2,384,720 and 2,315,528.

In the use of the camera described in Figs. 1 and 2, the rear housing 14 is swung open, as is partition 30; these two members being swung around the hinge points 13 and 31 respectively. Spool 26 is placed in the spool holder 28, carried by the partition 30, and the leader portion of the photosensitive sheet 22 is led across backing plate 24, between the arms 44 and around the pressure roll 40. Partition 30 is then moved to the position shown in Fig. 1. A coil of image-carrying sheet 32 is placed in the chamber 34, the leader portion thereof is aligned with the leader for the photosensitive material and these two leaders are led along the back of the partition 30 till they extend beyond the right-hand end of the camera. The rear housing 14 is now moved to the position shown in Fig. 1, thereby making the interior of the camera light-tight.

The outer wall 60 of the rear door 54 is moved to the position shown in Fig. 2 and the leader portion 70 of the heating bag 64 is fed between curved pressure surfaces 78 and 80. This leader portion 70 is then grasped and the heating bag is pulled between the pressure surfaces 79 and 80. As the container 74 passes between these two surfaces, the hydraulic pressure in the viscous aqueous liquid 76 is increased to such an extent that the liquid is forced from mouth 75 and is spread in an even layer across the surface of the stratum 66 containing the material to enter into the exothermic reaction. Pulling of the heating bag 64 is continued until the liquid is spread substantially completely throughout the area of the bag 64. The outer wall 60 of the door 54 is then moved to the dotted line position of Fig. 2, the heating bag, with the liquid spread therein, thus occupying the chamber 62 between the inner wall 58 and the heat-insulating stratum 61 associated with the outer wall 60 of the door 54.

Those portions of the two leaders, associated with sheet 22 and 32, extending from the right-hand end of the camera are then pulled to position and unexposed photosensitive area behind the exposure opening 20. This moving of the leaders positions a container, associated with a corresponding image area on the image-carrying sheet 32, so that the container is in advance of this area and is about to enter the bite of the pressure rolls. Exposure of the photosensitive area is now accomplished by suitably operating the shutter and the two leaders are then pulled to advance these layers in superposition between the pressure rolls 38 and 40. As these layers pass between these pressure rolls the processing liquid is released from the container and is spread in a uniform layer between the two sheets, thus forming a sandwich, this sandwich being advanced into the chamber 52 after formation. When the processing of the exposed area has been accomplished by spreading the processing liquid over the surface thereof, this exposed area resides in the chamber 52 and the sheet 32 is in heat-absorbing relation to the inner wall 58 of the door 54. Since this inner wall 58 is heated by the exothermic reaction in the heating bag 64, heat is transferred from the wall 58 to the sheet 32 and to the layer of spread processing liquid. This transferred heat maintains this layer of processing liquid at a sufficiently high temperature to accomplish the formation of both positive and negative images. At the end of a predetermined time, depending upon the degree of heat maintained in the processing liquid and the processing materials involved, the negative and positive images are completely formed and the door 54 may be opened to permit removal of that portion of the image-carrying sheet 32 containing the positive image. Removal of this area is preferably aided by having this area surrounded by perforations made in the sheet at the time of manufacture thereof.

The preferred form of the present invention speeds up the development of the positive and negative images and permits the use of such a processing camera regardless of the temperatures encountered in the use of the camera. It permits the use of processing materials, and amounts thereof, which give optimum images from the viewpoint of color, definition, tone and stability.

When a material is used which generates sufficient heat to cause the formation of steam, the steam may be discharged to the outside of the camera by supplying a suitable vent. In the alternative, the steam may be allowed to pass into the sandwich-receiving chamber to aid in the heating of the sandwich and also to wet the sandwich by condensation of the steam thereon. In either such case the chamber which holds the heating bag may be provided with a means for perforating the outer walls 68 of the bag to permit the escape of the generated steam. When the steam is discharged into the camera care must be taken to isolate the steam-filled area from the camera lens to prevent condensation on the lens.

Figure 4:
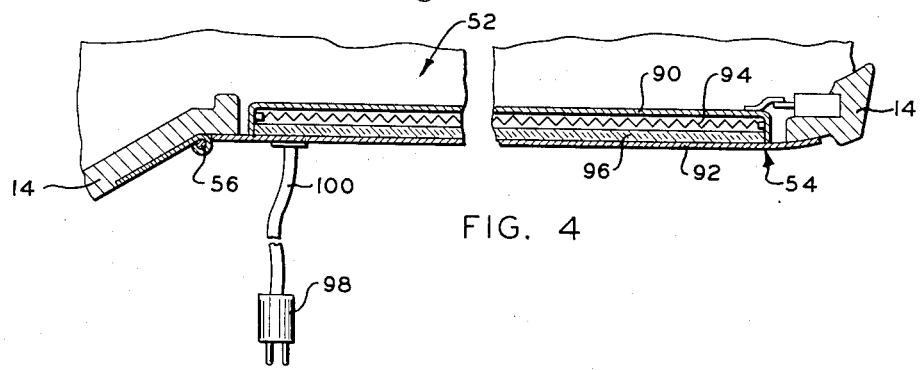
Fig. 4 is a diagrammatic fragmentary sectional view of still another form of the invention.

While one preferred embodiment of the invention has been described above, several other modifications of the invention are feasible without departing from the scope thereof. One such modification is shown in Fig. 4 wherein an electric heating element is employed in lieu of the exothermic heating reaction previously described. In this modification of the invention, only the rear door portion of the camera is illustrated, the other portions of the camera being preferably identical with those described in Figs. 1 and 2 above and like numbers referring to like elements in the other figures. As shown in Fig. 4, the rear door 54 comprises an inner wall 90 and an outer wall 92, between which there is provided an electric heating element 94. The outer wall 92 preferably includes an insulating stratum 96, similar to the stratum 61 mentioned previously. For supplying electrical energy to the heating element 94, there is provided a connection 100 and a plug 98 adapted to be connected to an electrical system of an automobile or an airplane, for example, or to be employed with any other suitable source of electrical energy such as a flashlight battery. If only a small quantity of electrical energy is available, such as would be the case if flashlight batteries were used, a switch may be advantageously associated with the camera so that the heating element 94 is energized only during those times when the camera is actually being used and a sandwich to be processed is in heat-absorbing relationship with the inner wall 90 of the rear door. If desired, such a switch may be actuated by a stop mechanism schematically indicated at 104 in Fig. 1. Such a stop mechanism is operated by a stop-release button 102 and is preferably employed with the camera of Fig. 1 for positioning the processed sandwich within the sandwich-receiving chamber 52. This switch is preferably so related to this stop-release button 102 that the switch is turned on when the sandwich is moved into position and is turned off when the rear door is opened to remove the processed image area. In this way a very small amount of electrical energy may be used to maintain the thin layer of processing liquid at the optimum temperature for best pictorial quality.

Figure 5:
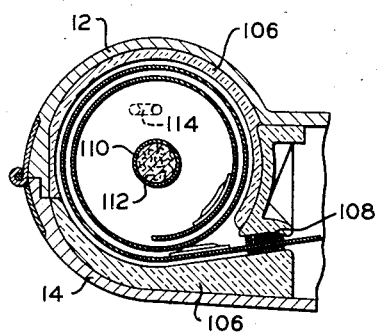
Fig. 5 is a diagrammatic fragmentary sectional view of still another form of the invention.

While preferred modifications of the invention have been described above, other forms thereof may be employed. For example, the heating element may be associated with the partition member 30 rather than with the rear door 54. Equally, a temperature-controlling medium, such as a heating element, may be inserted in the chamber 34, which holds the coil of image-carrying sheet 32, so that the processing liquid is heated prior to spreading. This last embodiment of the invention is shown in Fig. 5 wherein like numbers refer to like elements in the other figures. In this form of the invention the chamber 34, defined by the two housings 12 and 14, preferably includes an insulating wall section 106. In addition to this wall section 106, there is provided an insulating strip 108 of felt, for example, adjacent the path of sheet 32 from the interior of chamber 34 to the pressure rolls 38, 40. For supporting a temperature-controlling medium, such as a powder 112 of the type described previously, there is included a cylindrical tube 110 preferably positioned in the center of chamber 34. The embodiment of Fig. 5 has the advantage that the viscosity of the liquid, which is a function of its temperature, can be maintained within a desired range of viscosities for best spreading conditions. Thus, under extremely low temperatures, the viscosity may be found to be too high. When the liquid is heated the viscosity is lowered, this heating of the processing liquid additionally serving to accelerate the photochemical process sufficiently to obtain an optimum image.

When the camera of Fig. 5 is used under extremely high temperatures, a cooling medium may be advantageously employed within the cylindrical tube 110. This cooling medium will lower the temperature of the processing liquid in container 36 and will thus raise the viscosity of this liquid to a sufficiently high degree so as to permit uniform breakage of the containers during their passage between the pressure rolls. When a cooling medium is used it is, of course, arranged so as not to unduly lower the liquid temperature to a point where the speed of the photochemical reaction becomes too slow. The cooling medium may conveniently comprise a volatile solid or liquid such, for example, as "dry ice" or a piece of felt impregnated with a volatile alcohol. When such a volatile cooling medium is employed, chamber 34 is preferably provided with a tortuous light-tight vent 114 for permitting escape of the vapors from the cooling medium.

Figure 3:
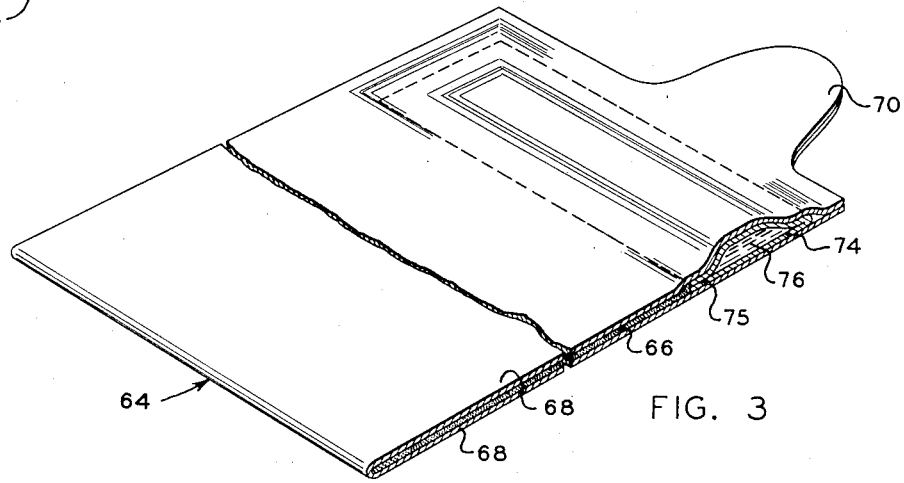
Fig. 3 is a diagrammatic fragmentary isometric view of a heating element particularly useful in the modification of the invention shown in Figs. 1 and 2.
Figure 6:
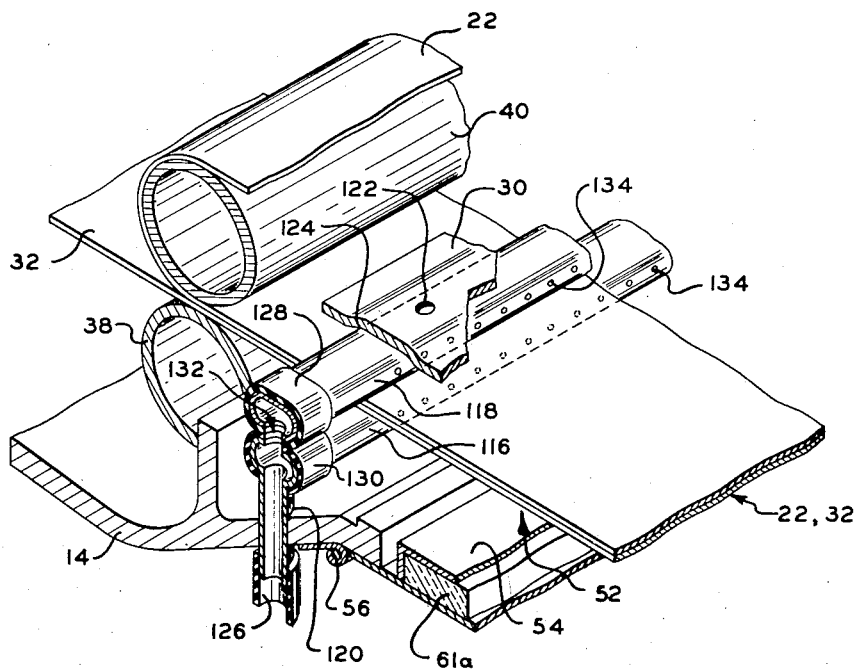
Fig. 6 is a diagrammatic fragmentary isometric view of still another form of the invention.

In the modification of the invention described in connection with the discussion of Figs. 1 and 3, the camera includes means for introducing a heating fluid into the camera body and distributing the fluid in a layer in heat-transferring relationship to the sandwich to be heated. While this fluid is described, in a preferred embodiment, as comprising a liquid it may equally comprise a gaseous fluid such as warm air. A modification of the invention using such an arrangement is shown in Fig. 6 wherein like numbers refer to like elements in the preceding figures. As seen in Fig. 6 the light seal blade 84 is preferably omitted from the modification of Figs. 1 and 2 and the space previously occupied thereby contains a heated gas-distributing means comprising a pair of manifolds 116 and 118. The lower manifold 116 is suitably mounted on the rear housing 14 such as by means of a fitting 120 which may also serve as the gas inlet to the manifolds. Upper manifold 118 is preferably secured to partition 30 by means such as a screw 122, the partition 30 being slightly recessed as at 124 to accommodate the manifold 118. Fitting 120 is preferably connected to a tube 126 which extends outside of the camera. The left-hand ends of the two manifolds include a gas pressure seal means shown as a pair of gasket members 128 and 130. A passage 132 permits gas entering the camera to be distributed between the two manifolds. Each manifold has a plurality of gas-discharged orifices 134 distributed along its length so that the gas emanating from the manifolds may pass on both sides of the sandwich 22, 32. In a preferred embodiment of the above invention the door 54 includes an insulating stratum 61a which prevents transfer of heat between the interior and exterior of the camera. In this case the partition 30 is also preferably made of insulating material or covered by a layer of such material.

In the use of the invention of Fig. 6, the rear housing 14 is opened, thus separating manifold 116 from manifold 118. The partition 30 is then moved to open position, the negative spool is placed in the spool holder and the negative leader is led around roll 40 and into the position shown in Fig. 6. The positive sheet 32 is placed in the camera, aligned with negative sheet 22, and the rear housing is closed, thus moving the sealing gasket 130 into operative relationship with sealing gasket 128 and sealing the edges of passage 132. The negative is next exposed and then is formed into the processing sandwich as previously described, this sandwich being advanced into the chamber 52 after formation. In a preferred method of using the temperature-controlling means of Fig. 6, the camera user inserts the outer end of tube 126 into his mouth and blows into the tube. The manifolds 116 and 118 distribute the user's relatively hot breath on both sides of the sandwich 22, 32, this hot breath passing along the outer surfaces of the sandwich until the right-hand end of the camera is reached. The excess breath may be conveniently discharged through the opening 82 at the right-hand end of the camera. The layer of breath on both sides of the sandwich has two important functions. In the first place it heats the sandwich, and secondly it provides an atmosphere of very high humidity to prevent evaporation of the water from the sandwich and may, in fact, even add water by condensation on the sandwich. When the user's breath is employed as the heated gas it is preferred that the seal around the exposure opening of the camera be sufficiently tight to prevent this breath from entering the camera bellows and condensing on the inner surface of the camera lens.

With regard to the pressure-applying surfaces 38 and 40 for spreading the processing liquid for processing the photosensitive sheet and the surfaces 78 and 80 for spreading the aqueous viscous solution for accomplishing the exothermic reaction, numerous alternative embodiments of these surfaces are feasible within the scope of the invention. As one example thereof, the spreading surfaces for the photochemical processing liquid may comprise a platelike element, such as a flat surface on partition 30, and a roller which is mounted for movement from one end of chamber 52 to the other end thereof, this roller releasing and spreading the processing liquid between two sheets held in stationary superposed relation in chamber 52. A like modification of the pressure-applying surfaces for the heating bag may equally be made. In addition, in less preferred forms of the invention, the pressure-applying surfaces 78, 80 associated with the rear door 54 may only release the aqueous liquid and gravity or capillary attraction may be employed for the spreading of this liquid and the permeation of the stratum 66 in heating unit bag 64.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a camera for photographically exposing a photosensitive sheet and processing said sheet in conjunction with another sheet and a processing liquid carried by a container, said camera being of the type which comprises means for exposing an area of said photosensitive sheet, means for supplying said photosensitive sheet, means for supplying said other sheet, means comprising a pair of pressure members between which said photosensitive sheet and said other sheet are moved in superposed relation with said container therebetween to cause the release and spreading of said liquid between said sheets, the combination with said pressure members of a chamber into which said superposed sheets are advanced after spreading of said liquid, said chamber having a passage adjacent said pair of pressure members for receiving said superposed sheets as the latter leave said pressure members, door means providing access to said chamber, means associated with said door means for supporting a heating element in heat-transferring relationship to said chamber, means for holding said superposed sheets in heat-absorbing relationship to said door, and means substantially slowing escape of heat through said door.

2. In a camera for photographically exposing a photosensitive sheet and processing said sheet in conjunction with another sheet and a processing liquid carried by a container, said camera being of the type which comprises means for exposing an area of said photosensitive sheet, means for supplying said photosensitive sheet, means for supplying said other sheet, means comprising a pair of pressure members between which said photosensitive sheet and said other sheet are moved in superposed relation with said container therebetween to cause the release and spreading of said liquid between said sheets, the combination with said pressure members of a chamber into which said superposed sheets are advanced after spreading of said liquid, said chamber having a passage adjacent said pair of pressure members for receiving said superposed sheets as the latter leave said pressure members, a hollow door providing access to said chamber, said hollow door providing a space therewithin in which a material capable of entering into an exothermic reaction may be positioned, a heat-transferring inner wall on said door, means for holding said superposed sheets in heat-absorbing relationship to said inner wall of said door, a heat-insulating outer wall on said door, and means for introducing said material and a liquid into said hollow door.

3. In a camera for photographically exposing a photosensitive sheet and processing said sheet in conjunction with another sheet and a processing liquid carried by a container, said camera being of the type which comprises means for exposing an area of said photosensitive sheet, means for supplying said photosensitive sheet, means for supplying said other sheet, means comprising a pair of pressure members between which said photosensitive sheet and said other sheet are moved in superposed relation with said container therebetween to cause the release and spreading of said liquid between said sheets, the combination with said pressure members of a chamber into which said superposed sheets are advanced after spreading of said liquid, said chamber having a passage adjacent said pair of pressure members for receiving said superposed sheets as the latter leave said pressure members, a hollow door providing access to said chamber, said hollow door providing a space therewithin in which a material capable of entering into an exothermic reaction may be positioned, a heat-transferring inner wall on said door, means for holding said superposed sheets in heat-absorbing relationship to said inner wall of said door, a heat-insulating outer wall on said door, means for introducing said material together with a container of liquid into said hollow door, and means associated with said door for releasing said last-named liquid from its container to permit said last-named liquid to contact said material.

4. In a camera in which a photosensitive sheet is exposed and thereafter processed, the combination of means providing an exposure chamber wherein a frame of said photosensitive sheet may be photoexposed, means providing a second chamber into which an exposed frame of said photosensitive sheet may be advanced in superposed relation with another sheet and processed by a layer of processing liquid located between said sheets, said second chamber being relatively thin and having a cross-section perpendicular to its thickness of sufficient area to receive an exposed frame of said photosensitive sheet in flat condition, and means providing a third chamber for a heating medium, said third chamber being relatively thin and having a cross-section perpendicular to its thickness large enough to overlie the entire area of one frame of said photosensitive sheet, said three chambers being superposed with respect to one another in the direction of their thickness, a heat-conducting wall separating said second chamber from said third chamber and a heat-insulating wall positioned between said third chamber and the exterior of said camera, said third chamber being adapted to so contain a heating medium as to transfer the heat therefrom substantially uniformly to a surface area of the superposed materials in said second chamber.

5. In a camera in which a photosensitive sheet is exposed and thereafter processed, the combination of means providing an exposure chamber wherein a frame of said photosensitive sheet may be photoexposed, means providing a second chamber into which an exposed frame of said photosensitive sheet may be advanced in superposed relation with another sheet and processed by a layer of processing liquid located between said sheets, said second chamber being relatively thin and having a cross-section perpendicular to its thickness of sufficient area to receive an exposed frame of said photosensitive sheet in flat condition, and means providing a third chamber for a heating medium, said third chamber being relatively thin and having a cross-section perpendicular to its thickness large enough to overlie the entire area of one frame of said photosensitive sheet, said three chambers being superposed with respect to one another in the direction of their thickness, a heat-conducting wall separating said second chamber from said third chamber and a heat-insulating wall positioned between said third chamber and the exterior of said camera, said third chamber being adapted to so contain a heating medium as to transfer the heat therefrom substantially uniformly to a surface area of the superposed materials in said second chamber, said third chamber means being hingedly secured to said second chamber means and constituting a door therefor whereby access may be had to the superposed materials within said second chamber from the exterior of said camera so that an area of one of said sheets at least equal to an exposed frame can be removed from said second chamber.

6. In a camera in which a photosensitive sheet is exposed and thereafter processed, the combination of means providing an exposure chamber wherein a frame of said photosensitive sheet may be photoexposed, means providing a second chamber into which an exposed frame of said photosensitive sheet may be advanced in superposed relation with another sheet and processed by a layer of processing liquid located between said sheets, said second chamber being relatively thin and having a cross-section perpendicular to its thickness of sufficient area to receive an exposed frame of said photosensitive sheet in flat condition, and means providing a third chamber for a heating medium, said third chamber being relatively thin and having a cross-section perpendicular to its thickness large enough to overlie the entire area of one frame of said photosensitive sheet, said three chambers being superposed with respect to one another in the direction of their thickness, a heat-conducting wall separating said second chamber from said third chamber and a heat-insulating wall positioned between said third chamber and the exterior of said camera, said third chamber being adapted to so contain a heating medium as to transfer the heat therefrom substantially uniformly to a surface area of the superposed materials in said second chamber, said third chamber means comprising an inlet passage and an exit passage, said passages being located at opposite ends of said third chamber so that a heat-generating unit may be drawn within said third chamber through said inlet passage and withdrawn therefrom through said exit passage.

7. In a camera in which a photosensitive sheet is exposed and thereafter processed, the combination of means providing an exposure chamber wherein a frame of said photosensitive sheet may be photoexposed, means providing a second chamber into which an exposed frame of said photosensitive sheet may be advanced in superposed relation with another sheet and processed by a layer of processing liquid located between said sheets, said second chamber being relatively thin and having a cross-section perpendicular to its thickness of sufficient area to receive an exposed frame of said photosensitive sheet in flat condition, and means providing a third chamber for a heating medium, said third chamber being relatively thin and having a cross-section perpendicular to its thickness large enough to overlie the entire area of one frame of said photosensitive sheet, said three chambers being superposed with respect to one another in the direction of their thickness, a heat-conducting wall separating said second chamber from said third chamber and a heat-insulating wall positioned between said third chamber and the exterior of said camera, said third chamber being adapted to so contain a heating medium as to transfer the heat therefrom substantially uniformly to a surface area of the superposed materials in said second chamber, said third chamber means containing an electric heating element as its heating medium, said heating element extending the length of said chamber.

8. In a camera in which a photosensitive sheet is exposed and thereafter processed, the combination of means providing an exposure chamber wherein a frame of said photosensitive sheet may be photoexposed, means providing a second chamber into which an exposed frame of said photosensitive sheet may be advanced in superposed relation with another sheet and processed by a layer of processing liquid located between said sheets, said second chamber being relatively thin and having a cross-section perpendicular to its thickness of sufficient area to receive an exposed frame of said photosensitive sheet in flat condition, and means providing a third chamber for a heating medium, said third chamber being relatively thin and having a cross-section perpendicular to its thickness large enough to overlie the entire area of one frame of said photosensitive sheet, said three chambers being superposed with respect to one another in the direction of their thickness, a heat-conducting wall separating said second chamber from said third chamber and a heat-insulating wall positioned between said third chamber and the exterior of said camera, said third chamber being adapted to so contain a heating medium as to transfer the heat therefrom substantially uniformly to a surface area of the superposed materials in said second chamber, said third chamber means comprising an inlet passage and an exit passage, said passages being located at opposite ends of said third chamber so that a heat-generating unit may be drawn within said third chamber through said inlet passage and withdrawn therefrom through said exit passage, said heat-insulating wall being hinged to said third chamber means and providing a door for the third chamber.

9. In a camera in which a photosensitive sheet is exposed and thereafter processed, the combination of means providing an exposure chamber wherein a frame of said photosensitive sheet may be photoexposed, means providing a second chamber into which an exposed frame of said photosensitive sheet may be advanced in superposed relation with another sheet and processed by a layer of processing liquid located between said sheets, said second chamber being relatively thin and having a cross-section perpendicular to its thickness of sufficient area to receive an exposed frame of said photosensitive sheet in flat condition, and means providing a third chamber for a heating medium, said third chamber being relatively thin and having a cross-section perpendicular to its thickness large enough to overlie the entire area of one frame of said photosensitive sheet, said three chambers being superposed with respect to one another in the direction of their thickness, a heat-conducting wall separating said second chamber from said third chamber and a heat-insulating wall positioned between said third chamber and the exterior of said camera, said third chamber being adapted to so contain a heating medium as to transfer the heat therefrom substantially uniformly to a surface area of the superposed materials in said second chamber, said third chamber means comprising an inlet passage and an exit passage, said passages being located at opposite ends of said third chamber so that a heat-generating unit may be drawn within said third chamber through said inlet passage and withdrawn therefrom through said exit passage, said heat-insulating wall being hinged to said third chamber means and providing a door for the third chamber, said third chamber means being hingedly secured to said second chamber means and constituting a door therefor which permits access to the superposed materials within the second chamber from the exterior of said camera.

10. In a camera apparatus in which a photosensitive sheet is exposed and thereafter processed, the combination of means providing an exposure chamber wherein a frame of said photosensitive sheet may be exposed, means providing a second chamber into which an exposed frame of said photosensitive sheet may be advanced in superposed relation with another sheet and processed by a layer of processing liquid located between said sheets, said second chamber being relatively thin and having a cross section perpendiculur to its thickness of sufficient area to receive an exposed frame of said photosensitive sheet in flat condition and a relatively flat heating means including an electrical heating element having a cross-sectional area perpendicular to its thickness large enough to overlie a substantial area of said second chamber, said second chamber and said heating means being superposed with respect to one another in the direction of their thickness with said heating element adjacent to said second chamber, said heating element being adapted to transfer the heat therefrom substantially uniformly to a substantial portion of the surface area of the superposed materials in said second chamber.

11. In a camera apparatus in which a photosensitive sheet is exposed and thereafter processed, the combination of means providing an exposure chamber wherein a frame of said photosensitive sheet may be exposed, means providing a second chamber into which an exposed frame of said photosensitive sheet may be advanced in superposed relation with another sheet and processed by a layer of processing liquid located between said sheets, said second chamber being relatively thin and having a cross section perpendicular to its thickness of sufficient area to receive an exposed frame of said photosensitive sheet in flat condition and heating means providing a third chamber for a heating medium, said third chamber being relatively thin and having a cross section perpendicular to its thickness large enough to overlie a substantial area of said second chamber, said second and third chambers being superposed with respect to one another in the direction of their thickness, a heat-conducting wall separating said second chamber from said third chamber, said third chamber being adapted to so contain a heating medium as to transfer the heat therefrom substantially uniformly to a substantial portion of the surface area of the superposed materials in said second chamber.

12. In a camera apparatus in which a photosensitive sheet is exposed and thereafter processed, the combination of means providing an exposure chamber wherein a frame of said photosensitive sheet may be exposed, means providing a second chamber into which an exposed frame of said photosensitive sheet may be advanced in superposed relation with another sheet and processed by a layer of processing liquid located between said sheets, said second chamber being relatively thin and having a cross section perpendicular to its thickness of sufficient area to receive an exposed frame of said photosensitive sheet in flat condition and a relatively flat heating means including an electrical heating element having a cross-sectional area perpendicular to its thickness large enough to overlie a substantial area of one frame of said photosensitive sheet, said two chambers and said heating element being superposed with respect to one another in the direction of their thickness, said heating element being adjacent to said second chamber and being adapted to transfer the heat therefrom substantially uniformly to a substantial portion of the surface area of the superposed materials in said second chamber.

13. In a camera apparatus in which a photosensitive sheet is exposed and thereafter processed, the combination of means providing an exposure chamber wherein a frame of said photosensitive sheet may be exposed, means providing a second chamber into which an exposed frame of said photosensitive sheet may be advanced in superposed relation with another sheet and processed by a layer of processing liquid located between said sheets, said second chamber being relatively thin and having a cross section perpendicular to its thickness of sufficient area to receive an exposed frame of said photosensitive sheet in flat condition and means providing a third chamber for a heating medium, said third chamber being relatively thin and having a cross section perpendicular to its thickness large enough to overlie a substantial portion of the area of one frame of said photosensitive sheet, said three chambers being superposed with respect to one another in the direction of their thickness, said third chamber being adapted to so contain a heating medium as to transfer the heat therefrom substantially uniformly to a substantial portion of the surface area of the superposed materials in said second chamber.

14. The apparatus of claim 12 wherein the heating element is located between the two chambers.

15. The apparatus of claim 13 wherein the third chamber for the heating medium is located between said first and second chambers.

EDWIN H. LAND.

REFERENCES CITED

The following references are of record in the file of this patent:

UNITED STATES PATENTS

| Number | Name | Date |
| --- | --- | --- |
| 1,424,816 | Grillone | Aug. 8, 1922 |
| 1,923,108 | Mehl | Aug. 22, 1933 |
| 2,327,733 | Moore | Aug. 24, 1943 |
| 2,346,530 | Wyllie | Apr. 11, 1944 |
| 2,446,668 | Tuttle | Aug. 10, 1948 |